United States Patent
Feather et al.

(10) Patent No.: US 6,671,420 B1
(45) Date of Patent: Dec. 30, 2003

(54) METHOD FOR PROCESSING SATURATED INTERVALS IN VIDEO SEQUENCES

(75) Inventors: Gary Feather, Camas, WA (US); Shaw-min Lei, Camas, WA (US); Eugene Paul Martinez, Jr., Portland, OR (US); Kristine Matthews, Vancouver, WA (US); Prasanna Modem, Vancouver, WA (US); Jordi Ribas, Vancouver, WA (US); Larry Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/250,680

(22) Filed: Feb. 16, 1999

(51) Int. Cl.[7] ............................. G06K 9/40; G06K 9/00; G03F 3/08; H04N 5/21

(52) U.S. Cl. ...................... 382/282; 382/164; 382/167; 382/169; 382/190; 382/274; 358/520; 358/521; 358/538; 348/396.1; 348/609; 348/631

(58) Field of Search ................................ 382/299, 260, 382/274, 275, 280, 291, 294, 295, 303, 300, 236, 252, 171, 162, 163, 164, 167, 166, 169, 190, 210; 358/475, 520, 521, 525, 532, 538, 518, 519, 527, 530

(56) References Cited

U.S. PATENT DOCUMENTS

| | | | | |
|---|---|---|---|---|
| 4,723,161 A | | 2/1988 | Koga ........................ 358/136 |
| 4,774,574 A | | 9/1988 | Daly et al. ................. 358/133 |
| 4,819,061 A | * | 4/1989 | Lang ........................... 358/31 |
| 5,212,544 A | * | 5/1993 | Kellar et al. ................ 358/22 |
| 5,315,670 A | | 5/1994 | Shapiro ..................... 358/133 |
| 5,469,188 A | * | 11/1995 | Krishnamurthy et al. ... 345/117 |
| 5,563,960 A | | 10/1996 | Shapiro ..................... 382/239 |
| 5,684,714 A | * | 11/1997 | Yogeshwar et al. ..... 364/514 R |
| 5,719,643 A | * | 2/1998 | Nakajima ................... 348/700 |
| 5,739,871 A | * | 4/1998 | Kim ............................ 348/674 |
| 5,745,190 A | * | 4/1998 | Ioka ........................... 348/700 |
| 5,845,010 A | * | 12/1998 | Silverbrook et al. ........ 382/232 |
| 5,904,653 A | * | 5/1999 | Hatfield et al. ............. 600/454 |
| 5,973,755 A | * | 10/1999 | Gabriel ...................... 348/699 |
| 5,982,926 A | * | 11/1999 | Kuo et al. .................. 382/167 |
| 6,002,806 A | * | 12/1999 | Morikawa ................... 382/274 |
| 6,094,453 A | * | 7/2000 | Gosselin et al. ............ 375/240 |
| 6,134,373 A | * | 10/2000 | Strolle et al. .................. 386/9 |

OTHER PUBLICATIONS

B.L. Yeo and B. Liu, "Rapid Scene Analysis on Compressed Video," *IEEE Transactions on Circuits and Systems for Video Technology*, vol. 5(6), pp. 533–544, 1995.

* cited by examiner

*Primary Examiner*—Bhavesh M. Mehta
*Assistant Examiner*—Yosef Kassa
(74) *Attorney, Agent, or Firm*—Marger Johnson & McCollom (57) ABSTRACT

A method for processing saturated video intervals in a video sequence. The method either removes or retains the saturated interval. If the interval is removed, the sequence is altered to accommodate the removal. The accommodation is either complete elimination, substitution of a derived interval, or substitution by repeating adjacent intervals. If the interval is retained, information is extracted while limiting the effects of the saturation. The interval can either be encoded with lower data rates, with increased data rates being applied to subsequent intervals, the temporal prediction encoding can be forced to a B interval, an I interval can be inserted, or the sequence restarted, or a coupled encoder decoder system can be set up that uses the same transform and clipping steps to limit the effects of saturation.

2 Claims, 2 Drawing Sheets

FIG.1
(PRIOR ART)

FRAME 2, FIELD 1    FRAME 1, FIELD 2    FRAME 1, FIELD 1

METHOD FOR PROCESSING SATURATED INTERVALS IN VIDEO SEQUENCES

RELATED APPLICATIONS

This application is related to copending U.S. patent application Ser. No. 09/250,971 filed Feb. 16, 199

BACKGROUND OF THE INVENTION

1. Field of the Invention

This invention relates to analysis of video image sequences, more particularly to methods for processing saturated intervals in continuous video sequences.

2. Background of the Invention

Digital video processing has become commonplace, whether the processed video data is displayed in digital or analog format. Several techniques in this area rely upon information in the video sequence both before and after the current interval. Two examples of these techniques are compression-decompression and interlaced-to-progressive scan conversion.

Because of the reliance on information in other intervals, intervals with saturated illumination cause problems in these techniques. Luminance saturation can occur when a bright flash of light, such as a camera flash, is recorded during the interval. Intervals that suffer from this problem will be referred to as saturation intervals. The effect of a saturated interval on various processing sequences can be seen in the MPEG coding/decoding process.

Compression of video data allows information to be transferred more quickly or stored in less space. Of course, when it is in compressed form, some method of decompressing it to restore the full image is also necessary. In some instances an encoder that performs compression will have a counterpart decoder that is in the same system. However, in many cases the data is compressed by one system but not decompressed in the same system. Defined protocols determine the compression scheme, which allows anyone with a decoder compliant, with that protocol to decompress the images. Examples of these types of protocols are MPEG-1 and MPEG-2, which will be used merely for discussion purposes.

MPEG standards refer to frames and fields. For simplicity of discussion, the unit of analysis will be intervals, with the understanding that an interval could be a frame, a field, a portion of a field, or some other, yet-to-be defined, segment of a video sequence. The boundaries of the intervals must be set prior to performing any analysis. In this way, the MPEG discussion will use the term intervals.

MPEG (Moving Picture Experts Group) has several intended phases of implementation. MPEG-1 is compression for "Coding of Moving Pictures and Associated Audio for Digital Storage Media at up to about 1.5 Mbits/s." MPEG-2 is a more general purpose scheme for "Generic Coding of Moving Pictures and Associated Audio." The schemes rely on three different kinds of intervals, "I" or intracoded intervals, "B" or bi-directional intervals, and "P" or predicted intervals.

Figure 1:
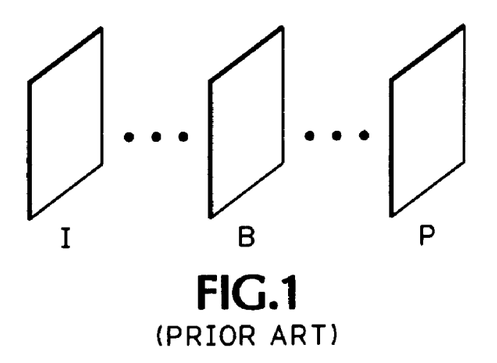
FIG. 1 is a prior art example of I-B-P fields in MPEG schemes.

An I interval is encoded as a still image, not using any past history. P intervals are predicted from the most recently coded I or P interval. The MPEG encoding process forms blocks and then derives the coefficients of the discrete cosine transform (DCT) for those blocks. Compressed P intervals usually contain motion vectors and difference coefficients from the last I or P interval. Compressed B intervals are similar to predicted intervals, except that their differences are from the closest two I or P intervals, one before and one after. The sequence of these intervals over time is shown in FIG. 1.

The sequence of I, B and P intervals can be of several different configurations. One example would be IPPPPBBI. If the saturated interval occurs at an I interval, that I interval cannot be used effectively for predicting subsequent P or B intervals. The P interval will require more encoding data because the P interval will be drastically different from the I interval, or it will be of a lower quality. If a saturated interval occurs at a P interval, the B intervals will is be of lower quality, as will subsequent P intervals.

The relationship between these intervals in the compression sequence results in the difficulties with the saturated intervals. However, other techniques use the information relationships between the intervals for processing. Another example is the conversion of incoming data from interlaced format to progressively scanned format.

Most broadcast video arrives at the receiver in interlaced format. Interlaced format typically divides a frame of data into two fields, which are intervals in this discussion, one for the odd-numbered lines, and one for the even-numbered lines. The fields are not necessarily easily combined together, since they were sent with the intention of being displayed separately. Interlaced format relies upon the response of the eye to integrate the two fields together, so each field can be displayed separately within a very short time. There may be slight differences between the two fields due to motion of objects in the intervals.

Figure 2:
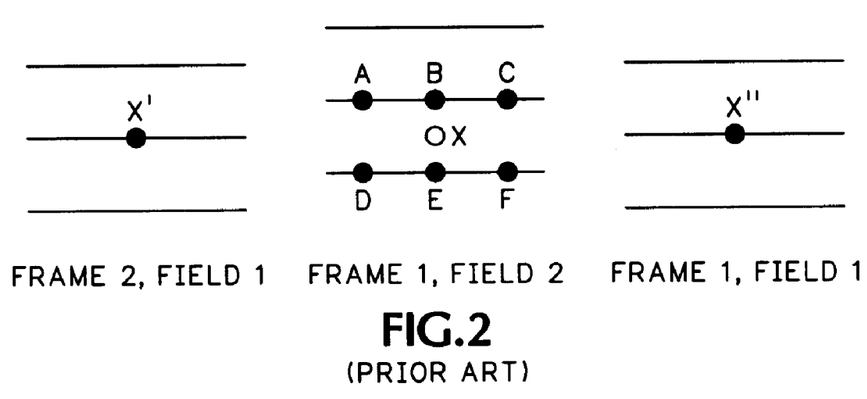
FIG. 2 is a schematic representation of an interlaced to progressive scan process.

For these reasons, among others, it is sometimes desirable to interpolate the lines missing from each field to constitute a frame that can be displayed in its entirety. One example is shown in FIG. 2. The sequence of fields shows that the picture element (pixel) X is to be interpolated in frame 1, field 2. Data can be used from the current field, from X's nearest neighbors, A, B, C, D, E and F. However, information can be used from the corresponding pixel locations from the previous field, field 1, frame 1, as well as the next field, field 1, frame 2, which are labeled X" and X', respectively.

In these instances, a saturated interval, such as those caused by photographic flashes, breaks the continuity of the analysis. If field 1, frame 1 is a saturated interval that data would be useless to assist in interpolating X. Similarly, if the saturated interval occurs in field 1, frame 2, that data is useless for interpolation. The lower amount of available data will result in an inaccurate interpolation of X, similar to the inaccurate coding and decoding of the I, P or B intervals due to the saturated interval.

Therefore, it would seem to be beneficial to develop a method to detect saturated intervals, and then, of course, to develop methods of processing them.

One method currently used to detect those saturated intervals is discussed in an article "Rapid Scene Analysis on Compressed Video," published in IEEE *Transactions on Circuits and Systems for Video Technology*, Vol. 5, No. 6, December, 1995, pp. 533–544, by Yeo and Liu (Yeo and Liu).

The method of Yeo and Liu is to detect a situation in which the sum of the absolute or squared differences between two frames varies from the local mean of the sum of absolute or squared differences by more than a given threshold.

For a better understanding of this method, let L(x,y,t) be the luminance of a pixel at location (x,y) in the field occurring at time t. For interlaced material, the even field will have luminances defined only at locations L(x,2y,t), and the corresponding odd field will have luminances defined only at L(x,2y+1,t+1), with luminance values at other pixel locations, the interleaving rows, in the given fields being identically zero. Let w be the number of columns in the luminance frame, and 2h be the number of lines in the luminance frame.

Using the above nomenclature, D(t) as used by Yeo and Liu is defined as $$D(t) = \sum_{x,y} |L(x, y, t) - L(x, y, t+2)|^\alpha + \sum_{x,y} |L(x, y, t+1) - L(x, y, t+3)|^\alpha$$

where the absolute difference (a=1) or squared difference (a=2) between successive fields is accumulated over the entire frame.

The method disclosed in the paper by Yeo and Liu then defines a detection scheme which searches for a [D(t), D(t+δ)] pair which are similar in magnitude, are the maximum of the values for a local window of width m+1, and differ from the average of the other m−1 values in that window by some defined margin. Note that the pair need not be contiguous in the sequence.

This method then prescribes a window of 10–15 frames for this purpose, but does not specify whether this window must be centered upon the frames of interest. Yeo and Liu also suggest the use of a metric that consists of the absolute difference between the sums of the pixel luminance values of successive frames as an alternative measure, with a similar detection scheme.

However, this technique has several limitations. Among these are the higher number of frames required, which reduces the ability for this technique to be implemented in real time, and increases the necessary processing and memory requirements. Additionally, Yeo and Liu describe no technique to solve the problems raised by the existence of these saturated intervals in any sort of processing, examples of which were discussed above.

Therefore, a method was needed to reliably detect saturated intervals in such a manner that the detection can be done in real time and with minimal processing overhead. Similarly, a method is needed to process these saturated intervals to mitigate their effects on any schemes that rely on relationships between video intervals.

SUMMARY OF THE INVENTION

One embodiment of the invention is a method allowing processing of saturated intervals in a sequence of video intervals. One embodiment of the method removes that saturated interval from the sequence and alters the sequence to accommodate the removal. The accommodation includes completely eliminating the interval, substituting a repeat of the previous interval for the removed interval, or interpolating a substitute interval for the removed interval.

Another embodiment retains the interval and extracts information while limiting the effects of the saturation. One embodiment reduces the data rate for the saturated interval and increases the data rate for subsequent intervals. Another embodiment uses temporal prediction-specific processing to force the encoding of the saturated interval as a bi-directional, or B, interval, or avoids using the saturated interval as a prediction interval by encoding the next interval as an intra, or I, interval.

Another embodiment relies upon known characteristics of the encoder and decoder in a closed system. The coefficients are manipulated to add an error value to the prediction value for whatever transform is applied, such as DCT or wavelet.

The new coefficients are then clipped to allow only those within a predefined range to be sent to the decoder. This results in only the low frequency coefficients being sent, while not altering the high frequency coefficients. In this way the information is still present but the effects of the saturation has been limited.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Any type of digital image processing for video sequences that uses information from preceding or succeeding intervals will suffer from saturated intervals. Saturated intervals will typically result from a flash from a camera or an arena central flash system.

Central flash systems are used in large sports arenas. In order to provide centralized flash for photographs, photographers are often given a radio transmitter to replace the flash attachments for their cameras. When the photographer triggers the shutter as key moments occur in a game or other sporting event, the transmitter triggers a flash apparatus typically mounted in the ceiling. This eliminates the problems with flashes going off directly in the participants' faces at crucial moments of the game, while still allowing sufficient illumination for quality pictures.

However, since the very use of the flash indicates it is a crucial moment, for example, the video information before, after and during the flash interval is very important information. In order to obtain this information accurately, it is therefore necessary to first identify the flash and then adjust the processing of the interval or intervals that have the flash.

The interval can be one of several types, depending upon the nature of the video sequence. If the sequence is obtained in a frame format, where the entire frame is captured at once, the interval would be equal to a video frame. However, if the sequence is obtained or broadcast in interlaced format, the interval would be a field. Other possibilities include that the flash occurred in only part of a field, or parts of two contiguous fields or frames.

Similarly, the use of the term flash is unduly restrictive. Other events than camera flashes could cause the same problem of saturating the luminance in any given interval, such as headlights approaching a darkened scene. Therefore, the phenomenon, discussed above in the flash example, will be referred to as saturation.

It should be noted that these techniques could also apply to intervals in which the luminance drops beyond a certain threshold, rendering the image almost completely dark. These intervals with insufficient illumination will be referred to as dim intervals. The techniques will be discussed in terms of detecting saturated intervals, with the understanding that this is just one example of a situation in which these techniques can be used.

In order to optimize digital image processing techniques such as compression and decompression and interlaced-to-progressive scan conversion, among others, the saturated interval must first be detected and somehow identified as requiring special processing. Then, the special processing method to reclaim the information, or to mitigate the effects of the saturation, must be provided. The discussion turns now to the first of these two requirements.

Luminance Saturation Detection

Figure 3:
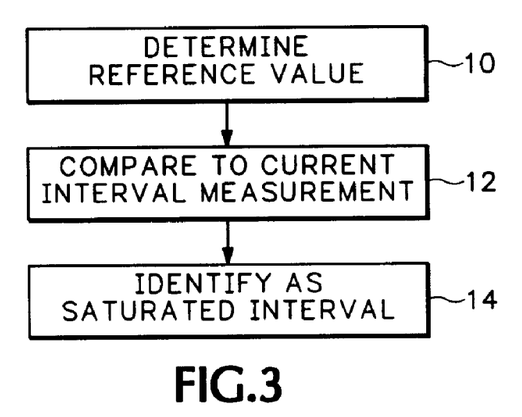
FIG. 3 shows a flowchart of a method in accordance with the invention.

Several specific examples employing the invention are discussed below. One method embodying the invention is illustrated by the flowchart of FIG. 3. In step 10, a local range of illumination is determined. This local range could be obtained from as few as two intervals, one on either side of the suspected saturated interval. It could also be a running average of all intervals, and any length in between.

The system designer will have specific knowledge of the requirements and limitations of a particular system and therefore should select the optimal number of intervals for setting the range of luminance measurements that does not include the saturated interval. The definition of normal luminance will vary depending upon the specific embodiment as will be discussed below.

Once the range of non-saturated luminance measurements is determined, intervals are analyzed to determine whether their luminance measurement is within that range or indicates that a saturated interval has occurred in step 12. If the process determines that the interval is a saturated interval, it is identified as such for further processing.

Having discussed the process that embodies the invention, the discussion now turns to several alternative implementations.

In a first embodiment, let A(t) be the mean luminance of the interval at time t, thus $$A(t) = \frac{\sum_{x,y} L(x, y, t)}{wh}.$$

Figure 4:
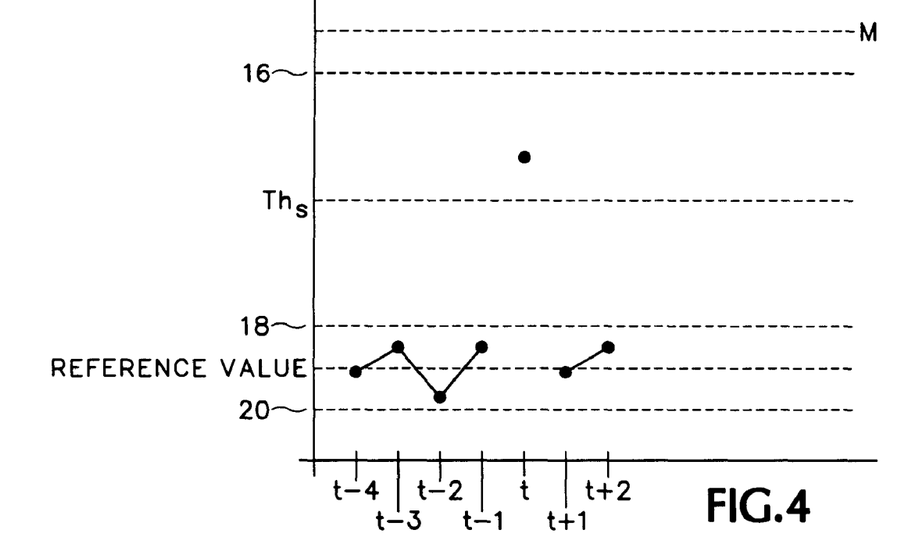
FIG. 4 is a graphical representation used in accordance with the invention.

FIG. 4 shows how this measure might vary upon the occurrence of a saturated interval. As in the previous discussion, w is the number of columns in the interval, and h is the number of rows in the interval.

FIG. 4 shows schematically how the mean luminance measure might vary around a saturated interval. The pattern of variation is similar for other measures, including some measurements for which the saturated interval value will decrease significantly from the local range. In each case, the variation from interval to interval will demonstrate small local variations within a scene, and larger variations from scene to scene. Only in the case of saturated intervals will a one-interval transient of significant magnitude occur. In the case where saturation occurs in part of one interval and part of another interval, it is possible that two saturated intervals will be detected.

Using the mean luminance as defined, interval t is a saturated interval if $$A(t) - A'(t) > \alpha(M - A'(t)),$$

$$|A(t-1) - A'(t)| < \beta(M - A'(t)),$$

and $$|A(t+1) - A'(t)| < \beta(M - A'(t))$$

where A'(t) is a measure of the local value of the mean luminance, M is the maximum possible pixel luminance value, α is typically 0.5, and β is typically 0.1.

From the above equations and reference to FIG. 4, it can be seen that α(M−A'(t)) determines the threshold level between the reference luminance value and the saturation value M. Also, the term β(M−A'(t)) determines the range of local measurements between lines 18 and 20. The reference value, from which the measurement is taken, is within this band of local measurements. For this example, A'(t) is the reference value.

The current interval t is defined as a saturated interval if three relationships with regard to the reference value are true. First, the mean luminance of the current interval minus the mean luminance of the non-saturated intervals, which will be referred to as the local mean luminance, must be greater than one half of the difference between the maximum value and the local mean luminance. Second, the absolute difference between the previous interval and the local mean luminance must be less than one-tenth the difference between the maximum value and the local mean luminance. Finally, the absolute difference between the next interval and the local mean luminance must be less than one-tenth the difference between the maximum value and the local mean luminance.

For a three-interval detector, the local mean luminance, A'(t), can be set to (A(t−1)+A(t+1))12. For a four-interval detector, A'(t) can be set to A(t−2). For robustness, A'(t) may be set to a running average of the mean luminance of the previous non-saturated k intervals, not including interval t. An essential point here is that for interlace video the summations for each mean luminance could be computed only over a single field, not the encompassing frame.

Two relationships exist in embodiments of this invention. First, the reference value shown in FIG. 4 is some metric of the luminance of intervals adjacent to the suspected saturated interval that falls within a predefined range. The range is shown as being between lines 18 and 20. Second, the same measurement for the current interval must be over the saturation threshold, $Th_s$ on FIG. 4.

Another alternative embodiment in accordance with the invention is to let N(t) be the count of the number of pixel values in an interval whose luminance is at or near saturation, thus $$N(t) = \sum_{x,y} S(L(x, y, t), M, \delta)$$

$$S(l, M, \delta) = \begin{cases} 1 & l \geq M(1 - \delta) \\ 0 & l < M(1 - \delta) \end{cases}$$

where M is as defined above, and δ is typically 0.05. The variable δ determines the threshold for saturation. If δ is set to equal 0.05, then all pixels at or above (1−δ)M, or 95% of maximum, will be deemed to be saturated. This is shown by line 16 on FIG. 4. A graph of the count will exhibit characteristics similar to FIG. 4 above of the mean luminance, with variation about a typical value, and a significant one-interval increase at the saturated interval. Then interval t is a saturated interval if $$N(t) > \alpha wh,$$

$$N(t-1) < \beta wh,$$

and $$N(t+1) < \beta wh$$

where $\alpha$ is typically 0.3, and $\beta$ is typically 0.1.

In this embodiment, then, the interval is a saturated interval if the following relationships are true. The count of saturated pixels must be greater than 30% of the number of pixels (wh, the number of rows multiplied by the columns). The count of saturated pixels in both the previous and following intervals must be less than 10% of the total number of pixels.

The use of the saturated pixel count can be applied to other embodiments. With N(t) defined as above, interval t is a saturated interval if $$N(t)-N'(t) > \alpha(wh-N'(t)),$$

$$|N(t-1)-N'(t)| < \beta(wh-N'(t)),$$

and $$|N(t+1)-N'(t)| < \beta(wh-N'(t))$$

where $\alpha$ is typically 0.3, and $\beta$ is typically 0.05.

In this instance, the relationships must be as follows. The difference between the current interval and the local average saturated pixel count, N'(t), must be greater than 30% of the difference between the total number of pixels and the local average saturated pixel count. Also, the absolute difference between the previous interval or the next interval and the local average saturated pixel count must be less than 5% of the difference between the total number of pixels and the local average saturated pixel count.

For a three-interval detector, N'(t) can be set to (N(t−1)+N(t+1))/2. For a four-interval detector, N'(t) can be set to N(t−2). For robustness, N'(t) may be set to a running average of the average saturated pixel counts of the previous non-saturated k intervals, not including interval t.

Other possible embodiments can be used that do not rely upon a higher value than the predetermined range. For example, the use of variances actually looks for a downward change in the value. Define the luminance variance of an interval V(t) as $$V(t) = \frac{\sum_{x,y} |L(x, y, t) - A(t)|^\alpha}{wh}$$

where $\alpha$ is 1 or 2. For this measure, the running luminance will transiently decrease at the saturated interval, while exhibiting small variation about a running average both before and after the saturated field. Then interval t is a saturated interval if $$V'(t)-V(t) > \alpha V'(t),$$

$$|V(t-1)-V'(t)| < \beta V'(t),$$

and $$|V(t+1)-V'(t)| < \beta V'(t),$$

where $\alpha$ is typically 0.5, and $\beta$ is typically 0.1.

Therefore, if the local variance minus the variance of the current interval is greater than 50% of the local variance, and the absolute values of the differences between the variances of the previous and next intervals individually and the local variance are less than 10% of the local variance, the interval is a saturated interval.

For a three-interval detector, V'(t) can be set to (V(t−1)+V(t+1))/2. For a four-interval detector, V'(t) can be set to V(t−2). For robustness, V'(t) may be set to a running average of the mean luminance of the previous non-saturated k intervals, not including intervals t.

This method will detect an interval in which variance drops, but the method does not account for luminance change, so an additional check for a minimum average luminance level or average luminance increase in the saturated interval may be incorporated for greater selectivity.

Implementations of this invention that actually track measurements that change both up and down are also possible. As an example, let $C_l(t)$ be a measure of the low-frequency content, and $C_h(t)$ be a measure of the high-frequency content, of the interval t. For example, in a DCT-based compression scheme, let c(i,j,k,l,t) be the (i,j)-th DCT coefficient for the 8×8 pixel block (k, l) in interval t, where the interval contains w/8 ×h/8 blocks. Then for example, let $$C_l(t) = \sum_{k,l} \sum_{i \leq I, j \leq J} |c(i, j, k, l, t)|$$

$$C_h(t) = \sum_{k,l} \sum_{i > I, j > J} |c(i, j, k, l, t)|$$

where I and J are typically 2.

Interval t is a saturated interval if:

$$C_l'(t)-C_l(t) > \alpha C_l'(t),$$

$$C_h'(t)-C_h(t) > \gamma C_h'(t),$$

$$|C_l(t-1)-C_l'(t)| < \beta C_l'(t),$$

$$|C_h(t-1)-C_h'(t)| < \beta C_h'(t),$$

$$|C_l(t+1)-C_l'(t)| < \beta C_l'(t),$$

and $$|C_h(t+1)-C_h'(t)| < \beta C_h'(t).$$

where $\alpha$ is typically 0.3, $\beta$ is typically 0.1, and $\gamma$ is typically 0.2.

Therefore, interval t is a saturated interval if several relationships are true. The difference between the low-frequency content of interval t and the average low-frequency content of the local intervals must be greater than 30% of the average low-frequency content. The difference between the average high-frequency content and the high-frequency content of interval t must be greater than 20% of the average high-frequency content. Similar to the other methods, the magnitude of the differences between the low or high frequency contents of local intervals and their respective averages must be less than 10% of these local averages.

For a three-interval detector, $C_l'(t)$ and $C_h'(t)$ can be set to $(C_l(t-1)+C_l(t+1))/2$ and $(C_h(t-1)+C_h(t+1))/2$, respectively. For a four-field interval, $C_l'(t)$ and $C_h'(t)$ can be set to $C_l(t-2)$ and $C_h(t-2)$ respectively. For robustness, $C_l'(t)$ and $C_h'(t)$ may be set to a running average of the sums of the absolute values of the low and high frequency components, respectively, of the previous non-saturated k intervals, not including interval t.

As an alternative, for a pyramidal wavelet decomposition of the interval, $C_l(t)$ may be the mean of the low-frequency coefficients, and $C_h(t)$ may be the mean of the absolute values of the high-frequency coefficients.

Up to this point in the discussion, most of the above embodiments of the invention have been discussed in terms of saturated intervals. However, it is possible that the saturation may occur in a portion of two successive fields or frames.

For the problem of detecting saturation in part of a field or frame, the foregoing methods might be modified to restrict the computation of the particular measure to some portion of a field or frame, and the indicated comparisons made between corresponding portions of the appropriate adjacent field or frames. For example, an interval may consist of the first h/2 lines of a field.

In summary, a method has been described which computes one or more measures which are indicative of the luminance and/or texture of a video interval, then determines if the given measure or measures differs by a significant amount between the value for the current interval and a reference interval. The measurement does not differ by a significant amount between the value for the first previous interval and the reference value, nor between the value for the first following interval and the reference value. The variation for the current interval is in a direction indicative of excessive illumination for the current interval. The reference value is the local average of non-saturated intervals, such as the mean luminance of the nearest non-saturated intervals.

Several options have been proposed for the reference value including, value of the measure or measures for the second previous interval, and a weighted average of the values of the measure or measures for a plurality of previous intervals.

Additionally the measure is computed over a portion of a field or frame, with the interval being defined as the boundaries of that portion. The comparison is made among corresponding intervals of the reference value and values for the first previous interval, the current interval, and the first following interval.

Finally, any of the above techniques could be used singly or in combination.

The discussion has focused on detection of saturated intervals up to this point. However, the method for detection serves to identify the saturated intervals. The methods for detection and processing can be implemented together or separately. Discussing both types of methods can make understanding of both more clear. The discussion now turns to processing of the saturated intervals.

Processing Saturated Intervals

Upon being informed that a interval is saturated, the system must make some choices as to what to do with that interval. One option is to eliminate the interval completely with or without substitution. Another is to retain the interval and make use of the information still available to the system despite the saturation.

A system constructed to eliminate the saturated interval has several options as well. In some instances, it may drop the saturated interval completely. However, this option will probably be available to prerecorded sequences only. If the saturated interval contains the only link between the previous and subsequent images in the sequence, such as a scene change that occurred during that interval, the interval will not be easily eliminated.

Some substitution of the eliminated interval can be made. Substitute intervals could be derived from surrounding intervals, either by interpolation or extrapolation. Interpolation typically uses both the next and previous adjacent intervals to calculate the values of the new interval. If motion prediction information is also available, the new interval could be extrapolated from the previous interval, adjacent the position of the new interval.

Another option is to repeat the adjacent interval in place of the saturated interval. The adjacent interval could either be the previous interval being repeated, or the next interval being pulled forward and then repeated.

These options may lead to objectionable artifacts, if the interpolation cannot be produced accurately, or if the previous interval is not consistent with the subsequent interval. Motion prediction and other forms of prediction can help in determining which substitution will result in the best image to fit into the sequence.

The system designer has alternatives to eliminating the saturated interval.

The system could retain the interval and process it in several different ways. For discussion purposes, the general techniques are divided into three groups: 1) nonspecific; 2) temporal prediction-specific techniques; and 3) coupled encoder/decoder. However, it must be noted that the techniques in each category may well be applicable to other categories and the division is merely for discussion purposes.

Nonspecific techniques apply to any type of coding and decoding system. It can apply to MPEG encoders and decoders and coupled decoders. One such technique is to decrease the data rate for the identified saturated interval. This will decrease its quality. The data rate for the subsequent intervals can be increased, which will improve their quality. Both the average data rate and the perceived image quality will remain nearly steady, despite the local fluctuations.

Nonspecific techniques have advantages in their adaptability to any encoder or decoder scheme, whether or not the techniques use temporal prediction. However, there are certain aspects of temporal prediction techniques that have advantages for the processing of saturated intervals. One of the clearest examples is in the MPEG structures.

The sequence of the MPEG encoder (the I, P and B intervals) can be transiently altered to force the encoding of the saturated interval as a B interval. B intervals do not serve as a reference to any other interval and are given fewer bits. This prevents other intervals from being predicted from inconsistent data. The fewer bits allocated to the B interval also lowers the impact of the saturation interval.

A second technique using MPEG schemes is to restart the interval sequence immediately after the saturated interval, or to insert an I interval after the saturated interval. This would occur if the saturated interval occurs at an I or a P interval. For example, if the saturated interval occurred at the second P interval of the sequence I P P, the next interval would be encoded as an I interval. Instead of the sequence being I P P P P B B, or some similar sequence, it would be I P P I P P P P . . .

This particular embodiment will work even if the interval has already been encoded prior to the detection of the saturated interval. Note that the detection process discussed above relies upon there being a specific relationship between the saturated interval and the next following interval. The encoding prior to detection would allow the detection process to be operating on intervals as they are being encoded, if necessary, to allow the system to run in real-time. The saturated interval would already be encoded when the relationship between it and the next following interval was detected. The correction can then be applied.

The above technique is specific to MPEG encoding and decoding. MPEG uses discrete cosine transform (DCT) encoding. Closed encoding and decoding systems using coefficients, DCT or not, in which the encoder and decoder characteristics are known, can use the third technique mentioned above as the coupled technique.

In these closed systems, certain additional techniques are available for systems in which the reference prediction intervals are retained as coefficient data rather than luminance data. In the case of saturated intervals, the luminance data will have no usefulness beyond allowing identification of the interval as saturated. However, systems that encode data as coefficients would have useful information in the coefficients for the saturated interval.

An example of such a system would be a DCT-based encoder in which motion estimation and compensation are performed using a DCT coefficient representation of the prediction interval. In such a system, a saturated interval may be encoded in the normal manner even if it falls on a P or B interval in the encoding sequence.

Figure 5:
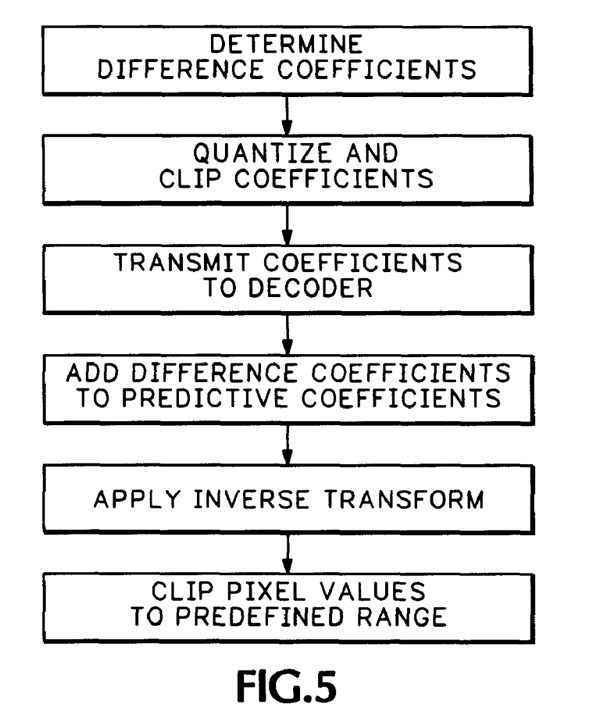
FIG. 5 shows a flowchart of a method in accordance with the invention.

The new interval is constructed by adding the error (difference) coefficients to the existing prediction coefficients. During the quantization step of the transform, in this case the DCT, it is possible that some coefficients will fall outside the discrete range allowed for the coefficients. During the reconstruction process, these coefficients outside the range must be clipped. This process is shown in flowchart form in FIG. 5.

When the pixel values are reproduced from the coefficients during the inverse transform step, some of these may end up outside the range of pixel values allowed by the particular scheme. One example is an 8-bit system, in which pixels having a value outside the range 0–255 will be clipped.

The characteristics of the inverse transform, and particularly the clipping step, permit efficiency in generating the luminance image while preserving detail information about the underlying scene.

It is helpful to consider an example of these steps, only for the purposes of clarifying the application of the invention. Consider the following series of intervals.

Interval I

-continued

Interval II

Interval III

In Intervals I and III, the left value is 240 and the right value is 40, on a range of 0–255. Interval II is saturated and has a value of 255 for both left and right.

For ease of discussion, a wavelet transform will be used. In this wavelet transform, the low-frequency information is calculated as the average of the high and low values. The high-frequency information is one-half the difference between them. For interval 1, the low-frequency coefficient is (240+40)/2, or 140. The high-frequency coefficient is (240−40)/2 or 100. For interval II, the low-frequency coefficient is 255, (255+255)/2, and the high-frequency coefficient is 0. The low-frequency difference coefficient for the two intervals is +115 (255−140), and, since the interval is a saturated interval, no value is transmitted for the high-frequency difference coefficient.

The difference coefficient data transmitted for these two intervals are +115, and no data. The coefficients for Interval IIII are the same as the coefficients for Interval I, but the transmitted difference coefficient is −115 (140−255) for the low-frequency coefficient and nothing for the high-frequency coefficient.

At the decoder, in this example, the coefficients for Interval I have been transmitted in their entirety. The difference coefficients of 115 and nothing result in the coefficients for Interval II being 255 (140+115) and 100 (100+0). The coefficients for Interval IIII are back to 140 and 100 as they were at the encoder.

Applying the inverse transform, where the low-frequency pixel values are the addition of the two and the high-frequency values are the difference between the two, the pixel values are 355 and 155. Since the pixel values have to be less than 256, these form an unrealizable image. The pixel values outside the range 0–255 are then clipped and the pixel values become 255 and 155.

In this technique, when a saturated interval occurs, only the DC or low-spatial-frequency coefficient differences are transmitted to the decoder. The resulting luminance image displays the desired saturation, while some detail is lost due to the clipping step. The high-frequency coefficients are manipulated to allow the next intervals to emerge without any adverse effects from the saturation.

It must be noted that in this example, the transform was applied prior to computing the difference coefficients. In many encoders, including MPEG encoders, the differences are found at the pixel level, and then the transform is applied resulting in the coefficients. However, in this embodiment of the invention, the difference coefficients are between coefficients, not between the pixel values and the reference image, as is currently being done. For wider applicability, the step of finding the difference coefficients in FIG. 5 will include either sequence above.

If the saturated interval is a P interval, the resulting image is still useful for prediction, as the high-spatial-frequency coefficients in the prediction interval are not altered. Subsequent intervals may still be well predicted from the prediction coefficients for the saturated interval from previous information, since detail is not lost. In this way, the information contained in the saturated interval may be extracted and used to ensure integrity and quality in the video sequence, rather than eliminating or downgrading the saturated interval's quality.

However, the presence of the saturated interval may necessitate a change in the motion estimation step for the saturated interval, and the immediately following spatially-matched interval for interlaced intervals. Motion estimation based upon luminance difference matching may be skipped entirely, since the luminance saturation will render that information unreliable for estimation. Other types of motion estimation may still be used.

For example, motion estimation may be performed by utilizing a DCT-coefficient or normalized-luminance based search method, possibly coupled with the use of previous motion vectors as motion predictors.

A block-difference matching technique will typically find large differences with all surrounding blocks when comparing flash and non-flash fields. However, the motion estimation algorithm can use prediction blocks generated by normalizing the DC luminance of the prediction block to match the reference block, alleviating the problem of discovering large differences and thereby normalizing the luminance.

If this normalization is accompanied by the use of prior motion vectors as guides for suitable candidate motion directions, then a robust match can be found between the saturated interval prediction coefficients, and the interval being encoded.

Again, note that in this case, the coefficients that form the reference interval do not correspond to a physically realizable luminance image, because of the range limitation in the input luminance data, and the corresponding clipping stage in the reconstruction process. However, the texture encoded in the coefficients will still represent the underlying texture of the scene, which should provide a good search match to the interval to be predicted.

This last characteristic of the process is very important. MPEG and other encoding/decoding schemes rely upon the ability to reconstruct images based upon the encoded data. In this process, the set of coefficients that encode the data cannot be used to reconstruct an image. This is true if the process is used in non-DCT based encoders as well. The coefficients produced in non-DCT schemes are again not realizable as images. The characteristics noted in the example above, while a non-DCT example, also applies to DCT based transforms.

All of the above techniques provide for retention of the saturated interval. This allows the encoding process to use any information still available in that interval. However, as also discussed above, it may be desirable for that interval to be eliminated from the sequence.

Thus, although there has been described to this point a particular embodiment for a method for detecting saturated intervals in video sequences, it is not intended that such specific references be considered as limitations upon the scope of this invention except in-so-far as set forth in the following claims.

What is claimed is:

1. A method of processing a video sequence having a luminance saturated interval, said method comprising of:

removing said luminance saturated interval from a series of intervals comprising the video sequence; and altering said video sequence by eliminating said interval entirely from said sequence to accommodate the removal of said interval.

2. A method of processing a video sequence having a luminance saturated interval, comprising the steps of:

determining difference coefficients between at least one video interval in a series of intervals comprising said sequence and said luminance saturated interval;

transmitting only low spatial frequency error coefficients;

adding error coefficients to predictive coefficients to produce image coefficients;

clipping said image coefficients that lie outside a predefined range;

applying an inverse transform to produce pixel values; and clipping pixel values that lie outside a predefined range.

* * * * *

UNITED STATES PATENT AND TRADEMARK OFFICE
CERTIFICATE OF CORRECTION

PATENT NO. : 6,671,420 B1
DATED : December 30, 2003
INVENTOR(S) : Feather et al.

It is certified that error appears in the above-identified patent and that said Letters Patent is hereby corrected as shown below:

Column 1,
Line 6, "Feb. 16, 199" should read -- Feb. 16, 1999. --.
Line 39, "compliant, with" should read -- compliant with --.

Column 2,
Line 11, "will is be of" should read -- will be of --.

Column 3,
Line 14, "difference (a = 1)" should read -- difference ($\alpha$ = 1) --.
Line 15, "(a = 2)" should read -- ($\alpha$ = 2) --.
Line 19, "D(t + $\delta$)] pair" should read -- D(t + $\delta$t)] pair --.

Column 6,
Line 6, "A(t-1)-A'(t)|<$\beta$(M-A'(t))," should read -- |A(t-1)-A'(t)|<$\beta$(M-A'(t)), --
Line 10, "A(t + 1)-A'(t)|<$\beta$(M-A'(t))" should read -- |A(t + 1)-A'(t)|<$\beta$(M-A'(t)) --
Line 37, "(A(t-1)+A(t+1))12." should read -- (A(t-1)+A(t+1))/2. --.

Column 7,
Line 25, "N(t-1)-N'(t)|<$\beta$($wh$-N'(t))," should read -- |N(t-1)-N'(t)|<$\beta$($wh$-N'(t)), --.
Line 28, "N(t+1)-N'(t)|<$\beta$($wh$-N'(t))" should read -- |N(t+1)-N'(t)|<$\beta$($wh$-N'(t)) --.

Column 10,
Line 23, "saturated interval. ¶ The" should read -- saturated interval. The --.

UNITED STATES PATENT AND TRADEMARK OFFICE
CERTIFICATE OF CORRECTION

PATENT NO. : 6,671,420 B1
DATED : December 30, 2003
INVENTOR(S) : Feather et al.

It is certified that error appears in the above-identified patent and that said Letters Patent is hereby corrected as shown below:

<u>Column 12,</u>
Lines 38 and 46, "Interval IIII are" should read -- Interval III are --.

Signed and Sealed this

First Day of February, 2005

JON W. DUDAS
*Director of the United States Patent and Trademark Office*